UNITED STATES PATENT OFFICE.

EMIL GOODWIRTH, OF ST. LOUIS, MISSOURI.

WRITING AND ENGROSSING INK.

1,347,454.     Specification of Letters Patent.     Patented July 20, 1920.

No Drawing.     Application filed January 12, 1920. Serial No. 350,959.

*To all whom it may concern:*

Be it known that I, EMIL GOODWIRTH, a citizen of the United States of America, residing at St. Louis, in St. Louis city and State of Missouri, and whose post-office address is No. 3621 Hartford street, in said city, have invented a new and useful Writing and Engrossing Ink, of which the following is a specification.

The object of the invention is to provide a composition of matter for use as a writing and engrossing ink which may be handled and stored or transported in bulk in either a dry or liquid form, and which in the dry form shall be subject to solution in water to reduce the same to a fluid state of any required consistency to suit the purpose for which it is to be used, and which in a liquid state may be thinned or supplied with water from time to time to replace loss of moisture by evaporation, and which at the same time shall be acid proof after it has been applied to a writing surface of paper or parchment to the end that the obliteration or removal of the same by a chemical agency may be prevented to adapt the ink for use in making permanent and durable records.

With this object in view, and subject to variations and modifications as to specific ingredients involving substitution of equivalents in physical and chemical properties, as defined by, and which fall within the scope of, the appended claims, the invention consists in employing in connection with a coloring matter or pigment, which, such as soluble blue, will lend itself to an aqueous solution, a dye assistant or assisting agent, such as salt, which serves to hold or stabilize the color and at the same time acts as a preservative to prevent staling of the water of solution and the tendency to freeze or precipitate the coloring agent on reduction of temperature.

A satisfactory combination of these ingredients, in the preparation of twelve quarts of ink, contemplates the use of fifteen ounces of soluble blue to ten ounces of salt, (sodium chlorid), and to this mixture should be added ten ounces of sal soda ($NaHCO_3$) which reacts upon and cuts the pigment and serves to carry the same into the fiber of the paper when the preparation is applied in liquid form which may be produced by dissolving in a sufficient quantity of (preferably) distilled water to aggregate the amount indicated. The water may be used in the first instance to prepare the ink in liquid form for use, or may be added as the ink is needed for use, the compound being packed and stored in a dry state. Owing to the characteristics and reactive effect of the dry ingredients, the solution thereof in a sufficient quantity of water may be effected without difficulty or appreciable loss of time as the ink is required and the consistency of the latter may be regulated by the consumer to suit the purpose for which it is to be employed.

Having described the invention, I claim:

1. A soluble ink composition consisting of soluble blue, a mild alkali and a dye assisting agent.

2. A soluble ink composition consisting of soluble blue, sal soda and common salt combined substantially in the proportions specified.

EMIL GOODWIRTH.